United States Patent [19]

Dukes et al.

[11] Patent Number: 4,480,913

[45] Date of Patent: Nov. 6, 1984

[54] FINE POSITIONING BEAM DIRECTOR SYSTEM

[75] Inventors: John N. Dukes, Los Altos Hills; Charles E. Bryson, III, Palo Alto; Lynn Weber, Saratoga; Mark Morganthaler, Palo Alto, all of Calif.

[73] Assignee: Hewlett-Packard Company, Palo Alto, Calif.

[21] Appl. No.: 340,158

[22] Filed: Jan. 18, 1982

Related U.S. Application Data

[63] Continuation of Ser. No. 112,965, Jan. 17, 1980, abandoned.

[51] Int. Cl.$^3$ .................................................. G01J 3/42
[52] U.S. Cl. ..................................... 356/319; 356/244; 356/328
[58] Field of Search ................. 356/319, 321, 323–326, 356/328, 329, 244, 246

[56] References Cited

U.S. PATENT DOCUMENTS 3,551,062 12/1970 Brown .................................. 356/244
4,227,079 10/1980 Dukes et al. ........................ 356/326

OTHER PUBLICATIONS

Hopkins et al., *Proc. Soc. Photo-Opt. Instrum. Eng.*, vol. 191, 1979, pp. 48–55.

Primary Examiner—F. L. Evans
Attorney, Agent, or Firm—John A. Frazzini

[57] ABSTRACT

A spectrophotometer optical section is presented which employs a fine positioning beam director which corrects for any deflections of the output beam path and accurately positions the optical beam on the detector slit of the spectrograph. The detector slit is chosen to have a size slightly smaller than the size of the optical beam at the detector slit to have high slit throughput without introducing spurious absorption. The sample cells need not be rigidly mounted thereby enabling use of a sample cell and cell holder which allows quick, easy interchange of cells.

6 Claims, 7 Drawing Figures

FINE POSITIONING BEAM DIRECTOR SYSTEM

CROSS REFERENCE TO RELATED APPLICATION

This is a continuation of application Ser. No. 112,965, filed Jan. 17, 1980, now abandoned.

BACKGROUND OF THE INVENTION

The invention relates, in general, to spectrophotometers and, more particularly, to spectrophotometer optical sections. Spectrophotometers can be divided into two broad classes of systems known as forward optics and reversed optics systems. In forward optics systems, the optical beam of the spectrophotometer passes through a monochromator before passing through the sample cell so that only a single frequency of light passes through the sample cell. The sample spectrum must therefore be measured in a serial manner by sweeping the light frequency through the spectral range while measuring the absorbance of the sample. In reversed optics systems, the beam passes through the sample cell before passing into a monochromator or spectrograph which disperses the beam. An advantage of the reversed optics systems is that the entire spectrum of the light passes through the sample cell so that the transmittance spectrum can be measured by a parallel detector system such as a spectrograph.

A typical reversed optics system known in the prior art is shown in FIG. 1. The optical beam originates from a light source such as a lamp 11. Light from a filament 12 of source 11 is focussed by a lens 13 onto a source slit 15 in an optical barrier 14. A lens 16 focusses the light which passes through slit 15 onto a sample cell 17. A lens 18 focusses the part of the beam which passes through the sample cell onto a detector slit 110 in an optical barrier 19. The series of lenses 13, 16, and 18 cooperate to produce an image of filament 12 onto detector slit 110. The light which passes through slit 110 strikes a diffraction element such as focussing grating 111 and the light in the diffraction pattern is measured by a detector such as photodiode array 112.

Although reversed optics systems provide the speed advantage of allowing parallel detection of the transmitted spectrum, such systems are subject to producing spurious absorption. This problem arises because the detector slit in a reversed optics system is typically much smaller than that used in a forward optics system. To maximize beam throughput (i.e. the efficiency of transferring light from the source to the detector) the beam should be selected to have a cross section comparable to the cross section of the detector. Thus, reversed optics systems present the problem of striking a small slit with a narrow beam so that small deviations in beam direction due, for example, to sample cell misalignment or variation in the index of refraction of the sample, will produce variations in light intensity on the detector. Such variations will appear in the resulting spectrum as spurious absorption of the sample.

The detector slit is made small in reversed optics systems for a pair of reasons. First, a small detector slit reduces the amount of stray light entering the spectrograph and therefore improves sensitivity. Second, parallel detection of the spectrum is typically achieved by use of an array of detectors, such as a photodiode array. Reduction of the size of the detector slit reduces the size of the image at the detector so that a larger number of detectors can be employed in an array of given dimensions. Thus, reduction of detector slit size improves the resolution of a reversed optics system. Referring to FIG. 4A, both throughput and aberration increase with increase in the solid angle subtended by focussing grating 411 at either detector slit 410 or at photodiode array 412. Hence, a compromise between throughput and aberration requires that the size of the detector slit be approximately equal to the size of a photodiode in array 412. Therefore, resolution cannot be improved by reducing the magnification of focussing grating 411, but instead, for a given size of array 412, requires reduction in the width of slit 410.

In the prior art there are known a number of schemes to avoid such spurious absorption. In one method, the optical elements are precisely manufactured and precisely aligned so that variation of the sample cell alignment cannot occur, but such a system cannot correct for beam deflection due to variation of the index of refraction of the sample. This method requires the sample cell to be rigidly mounted and precisely aligned and does not correct for other sources of beam deflection. Such a system is thus not amenable to easy or rapid exchange of sample cells. Interchange of sample cells is important for the different requirements of various chemical and physical measurement situations. A second scheme, illustrated in FIG. 2, employs a detector slit which is wide enough to pass the image irrespective of any expected beam deflections. Such a wide slit has the disadvantage of allowing a large amount of stray light into the spectrograph which reduces resolution and sensitivity. A third scheme known in the prior art, illustrated in FIG. 3, produces at the detector slit an image which is very much wider than the slit thereby providing uniform intensity near the slit, so that small deflections of the beam will not vary the light intensity on the slit. This uniformity is typically achieved by focussing one-and-a-half coils of filament 12 onto the detector slit as illustrated in FIG. 3. This method, however, has a low throughput of beam to the spectrograph. Such low throughput is unsuitable for parallel detector systems because the reduced area of the individual detector as compared to the area of detectors employed in prior art forward optics system has increased the need for high throughput. In addition, a large area exposure of the sample is necessary in this method, making such a system susceptable to problems with sample photodegradion.

SUMMARY OF THE INVENTION

In accordance with the illustrated preferred embodiment, the present invention provides a beam director system which is especially suited for use in a reversed optics parallel detector system in which high throughput (i.e. efficiency of transfer of light from the source to the detector) and accurate beam positioning are particularly important. This system includes in the path of the optical beam a beam director which is capable of fine positioning the beam on the detector slit to compensate for variations in beam direction due to such sources as sample cell misalignment and variation of the index of refraction of the sample. Because the system tolerates misalignment of sample cells, a sample cell holder may be used in which the sample cell is not rigidly mounted. This type of cell holder enables sample cells to be easily and rapidly interchanged. The fine positioning of the beam onto the detector slit also enables the use of a slit only slightly narrower than the cross section of the beam at the slit so that beam throughput is high.

DESCRIPTION OF THE PREFERRED EMBODIMENT

Figure 1:
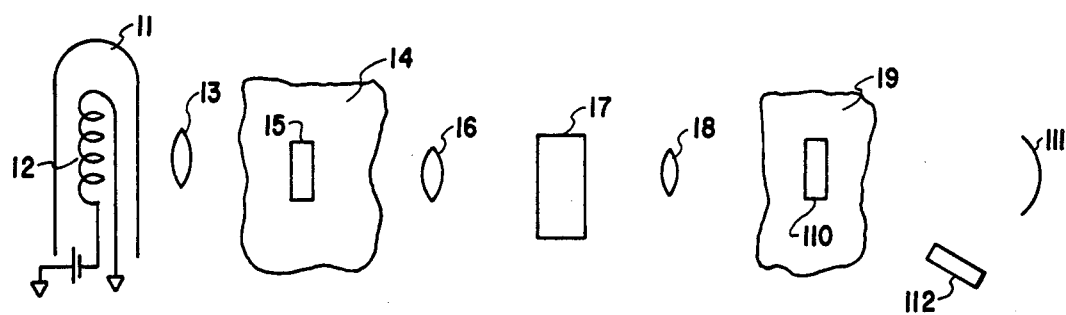
FIG. 1 illustrates the general structure of reversed optics systems such as those employed in parallel detector spectrophotometers.
Figure 2:
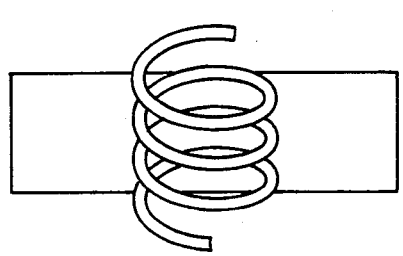
FIG. 2 illustrates the relationship between the detector slit and the image on the detector slit of the filament of the light source in one prior art scheme to eliminate spurious absorption.
Figure 3:
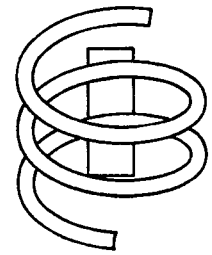
FIG. 3 illustrates the relationship between the detector slit and the image on the detector slit of the filament of the light source in another prior art scheme to reduce spurious absorption.
Figure 4A:
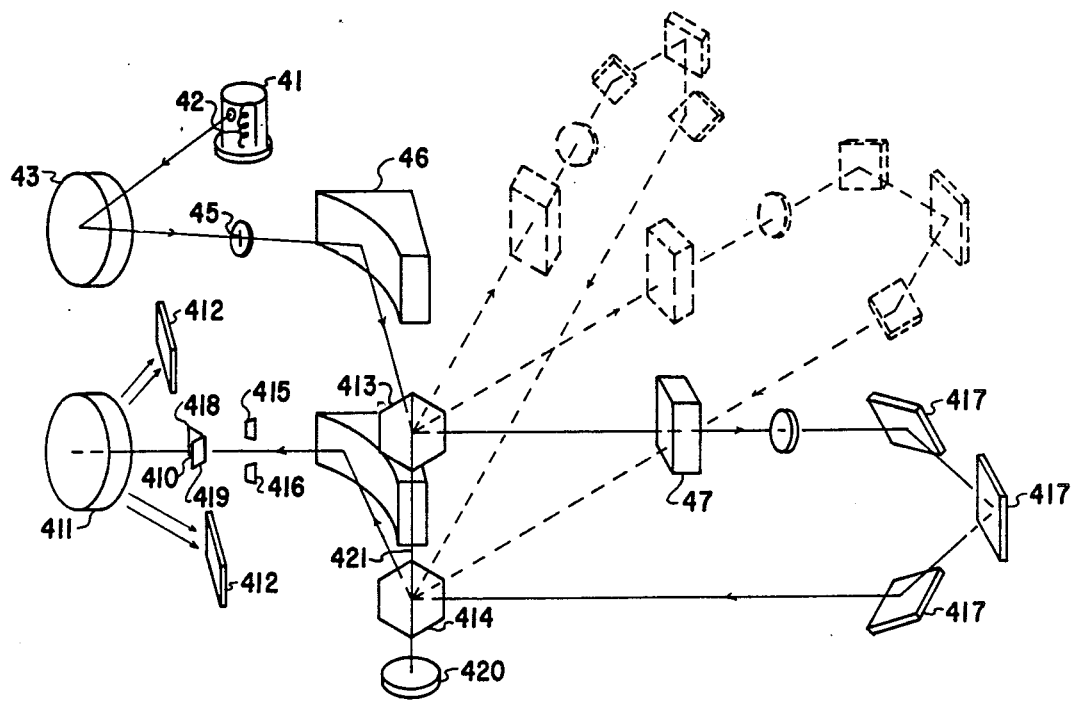
FIG. 4A illustrates a prior art beam director suitable for use in the disclosed invention.

In accordance with the disclosed preferred embodiment, a fine positioning beam director is included in the beam path of a spectrophotometer to compensate for beam deflection resulting from sources such as variation in sample cell orientation or variation in the index of refraction of the sample. An appropriate beam director is dislosed in detail in U.S. patent application Ser. No. 969,758, entitled "Optical Beam Director", filed by Dukes et al. on Dec. 15, 1978, now U.S. Pat. No. 4,227,079, and is shown also as part of the optical section presented in FIG. 4A herein. That beam director employs a pair of mirrors 413 and 414 mounted on a single rotatable shaft 421, the rotational orientation of which is controlled in response to signals from a pair of slit detectors 415 and 416. A beam of light originates from a source 41 and is focussed by a source mirror 43 onto a source slit 45. The light passing through slit 45 reflects off a source ellipse 46 along an input beam path of mirror 413 of the beam director. The beam is deflected by mirror 413 through a sample cell 47 to a cube corner 417 which returns the beam to mirror 414. The beam is then deflected by mirror 414 to a spectrograph ellipse 408 which focusses the light along an output beam path onto a detector slit 410.

A fine positioning system includes a slit 410, formed by a pair of reflective blades 418 and 419. The portion of the beam striking blade 418 is reflected to the associated slit detector 415 and the portion of the beam striking blade 419 is reflected to its associated slit detector 146. Each slit detector produces a signal proportional to the light intensity incident on that detector and a motor 420 connected to shaft 421, responds to the difference between these signals to orient the shaft to equalize these signals, and hence to center the output beam on slit 410. If the beam does not strike either blade 418 or 419, then the motor control is transferred to a microprocessor which implements a search mode in which the rotational orientation of shaft 421 is varied until the beam strikes one of the blades. When one of slit detectors 415 or 416 receives light from the beam, motor control is returned to the fine positioning system employing the signals from the slit detector.

Figure 4B:
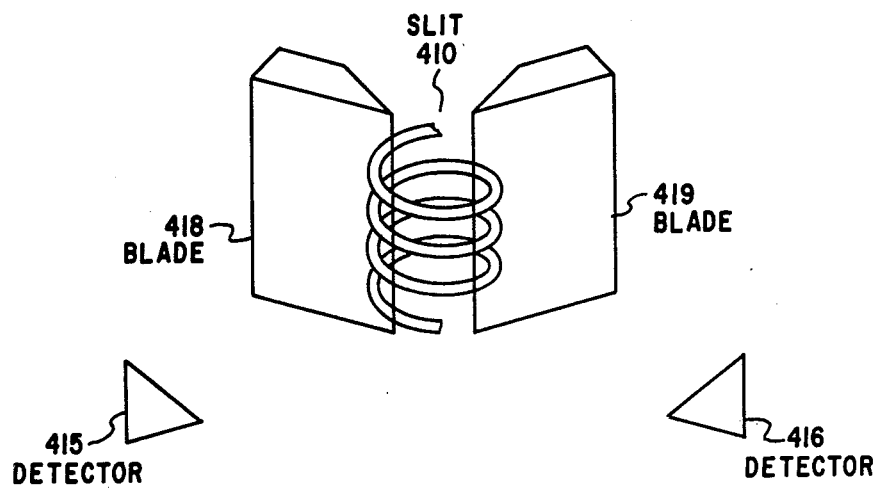
FIG. 4B illustrates the relationship between the detector slit and the image on the detector slit of the filament of the light source in accordance with an embodiment of the disclosed invention.

An expanded view of slit 410 showing the image on slit 410 of the filament 42 of source 41 is presented in FIG. 4B. The image at detector slit 410 must be wider than the detector slit in order to provide light to both slit detectors 415 and 416 for use in fine positioning the beam. The minimal fraction of the beam which must overlap onto blades 418 and 419 is determined by the sensitivity of the fine positioning system to light reflected from the blades and by the intensity of the incident beam. As the amount of light striking the blades decreases, the system's tolerance for absorption in the measurement sample decreases. The minimal fraction allowable is thus related to the amount of absorption which will be measured. In one spectrophotometer using a 0.06 mm by 0.5 mm slit and a beam intensity of $7 \times 10^{-10}$ w/mm$^2$, the fraction of overlap required was one-fourth for each blade. Any increase in beam intensity or beam director sensitivity to light reflected from the blades will improve the total absorbance range of the beam director system.

Figure 5A:
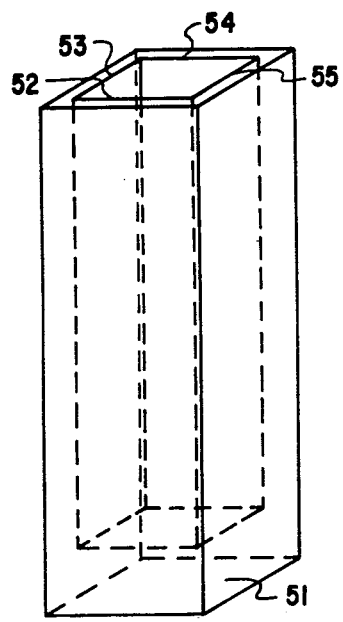
FIG. 5A shows a typical sample cell employed in an embodiment of the disclosed invention.
Figure 5B:
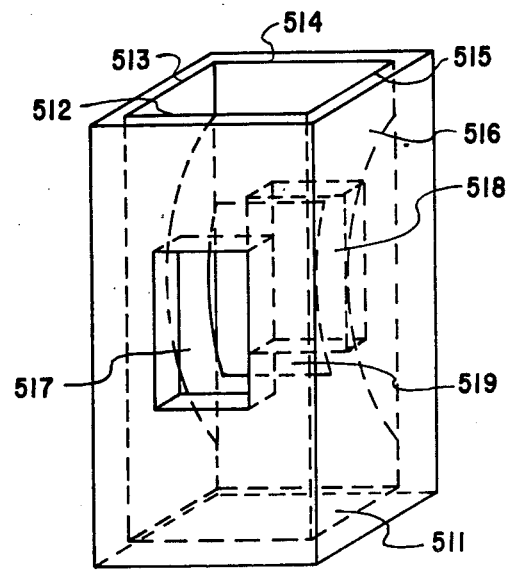
FIG. 5B shows a sample cell holder suitable for holding the cell shown in FIG. 5A.

The use of a beam director capable of fine positioning the beam and correcting for beam deflections also enables the use of sample cells that are not rigidly or precisely mounted. A sample cell suitable for use with such a beam director is shown in FIG. 5A and its sample holder is shown in FIG. 5B. The sample cell is a hollow cylinder open at only one end to allow insertion of a sample solution. The cell shown in FIG. 5A has rectangular cross-section although other cross-sections would also function properly. An advantage of the rectangular cross-section is that misalignment within the sample holder will produce less beam deflection than would a curved cross-section. The walls 52-55 and base 511 of the sample cell are formed of a material which is chemically inert to the sample solutions to be used. The walls are also transparent to the wavelength of light to be used.

The sample holder shown in FIG. 5B is a hollow cylinder open at one end to allow insertion of the sample cell. The hollow cylinder is formed by base 511, side walls 513 and 515, front wall 512, and back wall 514. The function of the base is to define the insertion depth of the sample cell. The cross-section of the cylindrical cavity formed by base 511 and walls 512 through 515 must be larger than the outer cross-section of the associated sample cells. In general, the cross-section of the cavity will be the same general shape as the outer cross-section of the sample cell but just enough larger than that of the sample cell to allow easy, quick insertion of the sample cell.

A compressible mechanism, such as leaf spring 516, is attached to rear wall 514 to press the sample cell against the front wall. The front wall thus functions as an alignment wall to align the orientation of the sample cell relative to the beam. A first aperture 517 in the front wall, a second aperture 518 in the rear wall, and a third aperture 519 in the leaf spring are aligned with the beam and are larger than the beam cross-section at the sample cell to enable the beam to pass through the sample cell. The cavity of the sample cell is large enough to intersect the entire beam and the spacing between the side walls 513 and 515 of the sample cell holder is small enough that the cavity of the sample cell is aligned with apertures 517 through 519. The height of the sample cell is larger than the height of the sample cell holder so that a portion of the sample cell extends above the holder to enable easy insertion or removal of the cell. The individual sample cells need not be precisely matched in construction because the beam director will compensate for beam deflections due to mismatches.

We claim:

1. A spectrophotometer optical section comprising:
   source means to produce an optical beam along a beam path;
   a sample cell interposed in the beam path;
   a pair of opaque blades disposed to form a detector slit; and
   a fine positioning beam director interposed in the beam path to form an output beam along a single output path which impinges on said detector slit, said beam director including:
   (1) slit detector means responsive to a fraction of the beam falling on each of said blades, for producing signals representing the amount of light falling on each blade, and
   (2) control means responsive to said signals to center the output beam on said detector slit, said output beam having a cross-section larger than the cross-section of the detector slit by an amount minimally sufficient to produce enough light on said blades to enable the beam director to center the output beam on the detector slit.

2. An improved optical section of the type wherein a source of light produces a light beam which is directed by a beam director to pass through a sample cell and impinge on an opaque barrier in which a detector slit has been produced to pass part of the beam to a detector, said beam director having a slit detector means responsive to any light incident on each side of the slit to produce signals representing the amount of light incident on each side of the slit, said beam director also having control means responsive to said signals to center the beam on the detector slit, said improvement comprising utilizing a slit having a width which is narrower than the width of the light beam by an amount which is minimally sufficient to produce enough overlap of the beam onto each side of the slit that the beam can be centered on the detector slit.

3. The optical section of claim 2 wherein:
   the sample cell is a hollow cylinder open at only one end to allow insertion of a sample liquid; and
   said optical section further includes a sample holder associated with each sample cell.

4. The optical section of claim 3 wherein said sample holder comprises:
   an alignment wall having a first aperture through which the optical beam can pass; and
   spring means for holding said sample cell against said alignment wall with the first aperture aligned with the beam to allow the optical beam to pass through said sample cell.

5. The optical section of claim 4 wherein:
   said sample cell has a rectangular outer cross-section;
   said sample holder is a hollow cylinder forming the walls and base of a cylindrical cavity open at only one end to allow insertion of a sample cell, said cavity having a rectangular cross-section larger than the cross-section of said sample cell and a height smaller than the height of said sample cell;
   said alignment wall coincides with a wall of the sample holder cavity; and
   a wall of said sample holder contains a second aperture, said first and second apertures being aligned with said sample cell to allow the optical beam to pass through the sample cell and the sample holder.

6. An optical section as recited in claim 2 wherein the source of light utilizes an optical filament having windings and wherein the detector slit has a height sufficient to enable light from a plurality of windings to pass through the slit.

* * * * *

UNITED STATES PATENT AND TRADEMARK OFFICE
CERTIFICATE OF CORRECTION

PATENT NO. : 4,480,913

DATED : November 6, 1984

INVENTOR(S) : John N. Dukes, Charles E. Bryson, III, Lynn Weber, and Mark Morganthaler It is certified that error appears in the above—identified patent and that said Letters Patent is hereby corrected as shown below:

Column 2, line 48, "susceptable" should read -- susceptible --;

Column 2, lines 48, 49, "photodegradion" should read -- photodegradation --;

Column 4, line 38, "wavelength" should read -- wavelengths --.

Signed and Sealed this

Sixteenth Day of April 1985

[SEAL]

Attest:

DONALD J. QUIGG

Attesting Officer     Acting Commissioner of Patents and Trademarks